US009164876B2

(12) United States Patent
He et al.

(10) Patent No.: US 9,164,876 B2
(45) Date of Patent: Oct. 20, 2015

(54) CONTROLLING ASYNCHRONOUS CALL RETURN

(71) Applicant: International Business Machines Corporation, Armonk, NY (US)

(72) Inventors: Gu Yi He, Shanghai (CN); Tao Kang, Shanghai (CN); Hua Hong Wang, Shanghai (CN); Qiang Wang, Wuhan (CN); Chao Zheng, Shanghai (CN); Si Qi Zhong, Shanghai (CN); Xian Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/770,194

(22) Filed: Feb. 19, 2013

(65) Prior Publication Data

US 2013/0263095 A1 Oct. 3, 2013

(30) Foreign Application Priority Data

Mar. 30, 2012 (CN) .......................... 2012 1 0091156

(51) Int. Cl.
*G06F 11/36* (2006.01)
*G06F 9/44* (2006.01)

(52) U.S. Cl.
CPC ........ *G06F 11/3664* (2013.01); *G06F 11/3632* (2013.01); *G06F 11/3644* (2013.01)

(58) Field of Classification Search
None
See application file for complete search history.

(56) References Cited

U.S. PATENT DOCUMENTS

| 5,892,941 | A | * | 4/1999 | Khan et al. | 703/22 |
|---|---|---|---|---|---|
| 7,380,235 | B1 | * | 5/2008 | Fathalla | 717/109 |
| 7,451,455 | B1 | * | 11/2008 | El-Haj | 719/320 |
| 7,500,149 | B2 | | 3/2009 | Grieskamp et al. | |
| 7,506,318 | B1 | * | 3/2009 | Lindo et al. | 717/130 |
| 8,032,886 | B2 | | 10/2011 | Joy et al. | |
| 8,756,579 | B1 | * | 6/2014 | Colton et al. | 717/126 |
| 8,782,611 | B1 | * | 7/2014 | Kretzler et al. | 717/129 |
| 2005/0246692 | A1 | | 11/2005 | Poteryakhin et al. | |
| 2007/0168968 | A1 | * | 7/2007 | Bates et al. | 717/124 |
| 2008/0052683 | A1 | * | 2/2008 | Bates et al. | 717/129 |
| 2009/0138858 | A1 | * | 5/2009 | Livshits et al. | 717/130 |
| 2011/0145791 | A1 | * | 6/2011 | Kim et al. | 717/124 |
| 2011/0258608 | A1 | * | 10/2011 | Li et al. | 717/127 |
| 2012/0266144 | A1 | * | 10/2012 | Halliday et al. | 717/129 |
| 2013/0311973 | A1 | * | 11/2013 | Rice et al. | 717/124 |

OTHER PUBLICATIONS

Buhr et al., "KDB: A Multi-threaded Debugger for Multi-threaded Applications," 1996, Proceedings of the SIGMETRICS symposium on Parallel and distributed tools, pp. 80-87.*

(Continued)

*Primary Examiner* — Thuy Dao
*Assistant Examiner* — Stephen Berman
(74) *Attorney, Agent, or Firm* — Cantor Colburn LLP; Terry Carroll (57) ABSTRACT

Aspects include controlling asynchronous call return in a program. At least one asynchronous call is detected in the program. Execution of the program is stopped at a breakpoint in response to detecting that the breakpoint is set in the program. At least one callback corresponding to the at least one asynchronous call is obtained. The at least one callback is inserted into one or more specified positions of the program respectively according to a user selection. Execution of the program continues from the breakpoint in response to the insertion of the at least one callback into the program.

11 Claims, 3 Drawing Sheets

(56) References Cited

OTHER PUBLICATIONS

Thane et al., "Replay debugging of real-time systems using time machines," 2003, Proceedings. International Parallel and Distributed Processing Symposium, pp. 1-8.*

Fernandez et al., "Ddbx-LPP: a dynamic software tool for debugging asynchronous distributed algorithms on loosely-coupled parallel processors," 1991, 1991 IEEE International Conference on Systems, Man, and Cybernetics, Decision Aiding for Complex Systems, Conference Proceedings, vol. 1, pp. 639-644.*

* cited by examiner

CONTROLLING ASYNCHRONOUS CALL RETURN

PRIORITY

The present application claims priority to China Patent Application No. 201210091156.6 filed on 30 Mar. 2012, and all the benefits accruing therefrom under 35U.S.C. §119, the contents of which in its entirety are herein incorporated by reference.

BACKGROUND

The present invention relates to asynchronous calls in programs, and more specifically, to a method and apparatus for controlling asynchronous calls.

Asynchronous calls are used in many programs. When conducting an asynchronous call, the main thread of the caller does not need to wait for the execution of the called function, but continues executing the subsequent code. Once the callee finishes executing the called function, it in return calls the original caller to return the result, which is referred to as callback. Accordingly, the main thread obtains the execution result via the callback function. However, one major problem of the asynchronous call is that the call return time is not predetermined. Therefore, in the case of a plurality of asynchronous calls, the execution order of the corresponding callback functions cannot be predetermined. This adds difficulty to the testing and debugging of programs.

Figure 1:
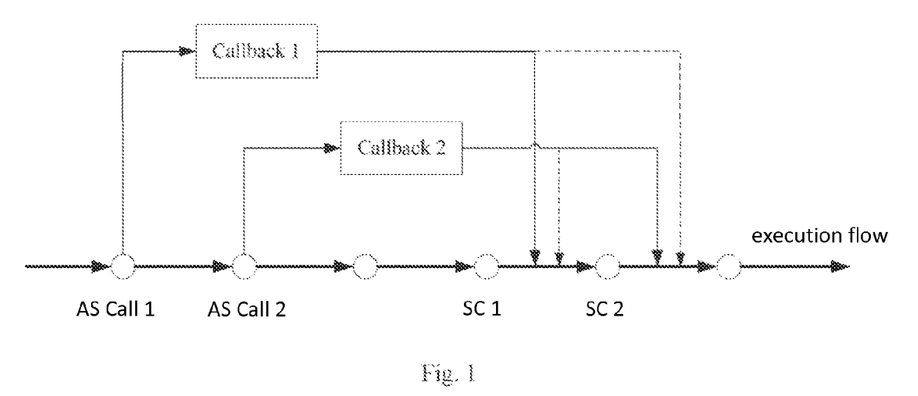
FIG. 1 shows the execution flow of a program comprising asynchronous calls.

FIG. 1 shows the execution flow of a program comprising asynchronous calls. In the example of FIG. 1, the main program successively executes two asynchronous calls, AS Call 1 and AS Call 2, and then continues executing other functions, such as synchronous call functions SC1, SC2, etc. For the two asynchronous call functions, developers may expect to obtain returned results of the two calls in sequence, for example, obtaining the callback of AS Call 1 between SC1 and SC2, and obtaining the callback of AS Call 2 after SC2. However, depending on the execution of AS Call 1 and AS Call 2 by the callee, the execution order of the corresponding callback functions may be changed. For example, in certain cases, the return time of AS Call 2 may be earlier than that of AS Call 1 (as shown by the dashed lines in FIG. 1). In this case, the execution result of the main program may be different from the expected result of sequential return, thus causing errors. As these errors only occur in a certain return order of asynchronous calls, it is very difficult to find them in a conventional program debugging process.

As the return time of the asynchronous calls cannot be controlled, in order to conduct debugging, developers usually have to execute the program a large number of times, trying to reproduce the asynchronous call return order that causes errors. However, the procedure is time consuming, and still cannot guarantee a debugging result.

In another solution, developers extract the asynchronous call-related logic from the program, and test it. For example, suppose there are 5 asynchronous calls in a program, and a certain return order would cause errors in the program. The developers need to spend a lot of time to generate permutations of all possible return orders, and find among them the order that causes errors. In addition, with the rapid development of various program frameworks, it is very difficult to extract a single logical operation from complex program functional blocks.

Therefore, it is desired to be able to control the return of the asynchronous calls, thereby facilitating the testing and debugging of programs.

SUMMARY

According to one embodiment, a method for controlling asynchronous call return in a program is provided. At least one asynchronous call is detected in the program. Execution of the program is stopped at a breakpoint in response to detecting that the breakpoint is set in the program. At least one callback corresponding to the at least one asynchronous call is obtained. The at least one callback is inserted into one or more specified positions of the program respectively according to a user selection. Execution of the program continues from the breakpoint in response to the insertion of the at least one callback into the program.

According to another embodiment, an apparatus for controlling asynchronous call return in a program is provided. A detecting unit is configured to detect at least one asynchronous call in the program. A stopping unit is configured to stop execution of the program at a breakpoint in response to detecting that the breakpoint is set in the program. A callback obtaining unit is configured to obtain at least one callback corresponding to the at least one asynchronous call. A callback inserting unit is configured to insert the at least one callback into one or more specified positions of the program respectively according to a user selection. An executing unit is configured to continue execution of the program from the breakpoint in response to the insertion of the at least one callback into the program.

According to a further embodiment, a computer program product for controlling asynchronous call return in a program is provided. The computer program product includes a computer readable storage medium having computer readable program code embodied therewith. The computer readable program code is configured to detect at least one asynchronous call in the program and stop execution of the program at a breakpoint in response to detecting that the breakpoint is set in the program. The computer readable program code is further configured to obtain at least one callback corresponding to the at least one asynchronous call and insert the at least one callback into one or more specified positions of the program respectively according to a user selection. Execution of the program continues from the breakpoint in response to the insertion of the at least one callback into the program.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments are described in more detail with reference to the accompanying drawings, in which the embodiments of the present disclosure have been illustrated. However, the present disclosure can be implemented in various manners, and thus should not be construed to be limited to the embodiments disclosed herein. To the contrary, those embodiments are provided for thorough and complete understanding of the present disclosure.

Figure 2:
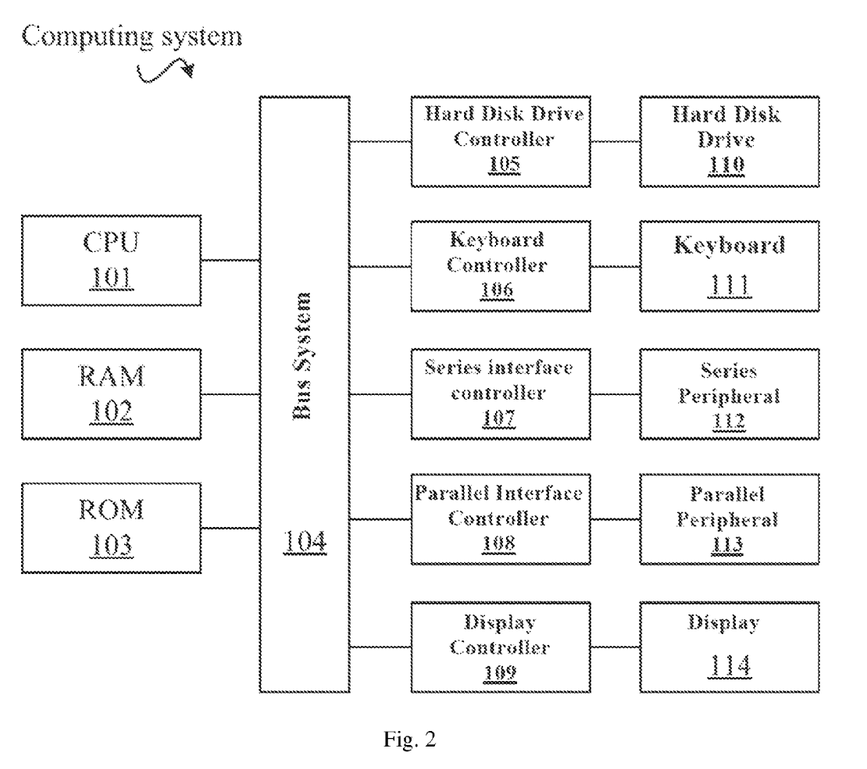
FIG. 2 shows an exemplary computer system which is applicable to implement embodiments.

FIG. 2 shows an exemplary computer system 100 which is applicable to implement exemplary embodiments. As shown in FIG. 2, the computer system 100 may include: a CPU (Central Processing Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 2 is only for exemplary purposes. In some cases, some devices may be added to or removed from the computer system 100 based on specific situations.

As will be appreciated by one skilled in the art, aspects may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage mediums would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described below with reference to flowchart illustrations and/or block diagrams of methods, apparatuses (systems), and computer program products according to exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
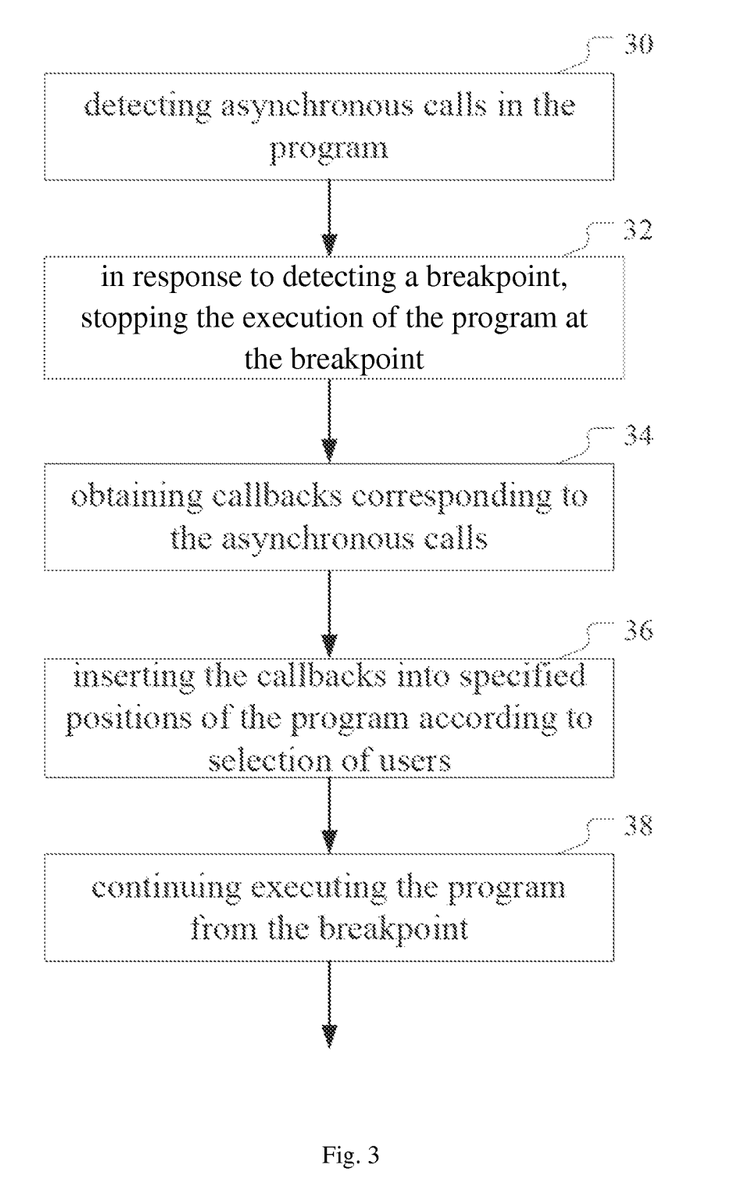
FIG. 3 shows a method for controlling asynchronous call return according to one embodiment.

With reference now to FIG. 3, this figure shows a method for controlling asynchronous call return according to an embodiment. As shown in FIG. 3, the method comprises: block 30 of detecting at least one asynchronous call in the program; block 32 of, in response to detecting a breakpoint that is set in the program, stopping the execution of the program at the breakpoint; block 34 of obtaining at least one callback corresponding to the at least one asynchronous call; block 36 of inserting at least one callback into specified position(s) of the program respectively according to user selection(s); and block 38 of continuing executing the program from the breakpoint. The implementing mode of the above steps will now be described in conjunction with detailed examples.

In one embodiment, the above method is mainly applicable to single-threaded programs, such as a script program. Next, a typical script program, JavaScript, is used as an example to describe implementing of the above method. In JavaScript, as a single thread is used to execute program code line-by-line, an asynchronous call is mainly realized by communication with a server end. In particular, when making an asynchronous call, the main program sends a request for the asynchronous call to the server end, and continues executing subsequent code while waiting for the response of the server end. After properly processing the asynchronous call function, the server end callbacks the main program. By using callback functions, the main program may obtain the processing result of the asynchronous call. Because of various factors, such as different communication efficiency with the server end, different processing capacity of the server end platform, etc., the return time of the asynchronous call cannot be pre-determined. Therefore, the above blocks 30-38 are executed to control the return of the asynchronous call.

In particular, block 30 detects the asynchronous call in the program. JavaScript has limited types of asynchronous call functions, mainly including XMLHttpRequest (XHR), which is commonly used in an Ajax feature, as well as setTimeOut, setInterval, and so on. Therefore, for JavaScript, a code set may be predefined, which defines possibly used asynchronous call functions. In block 30, the process scans program code, compares the scanned code with the content of the code set, and thus detects whether the asynchronous call occurred in the program. For example, once detecting the code callXMLHttpRequest in the program, it can be deemed that an asynchronous call is conducted in the program. In the case of detecting a plurality of asynchronous calls, reference numbers may be assigned to these asynchronous calls, so as to help subsequent distinction.

One or more users may set breakpoints where necessary in the program when testing the program. The setting of breakpoints may be guided or labeled by a predetermined key word, such as "mark", "breakpoint", etc. When the program code is scanned, the above mentioned key word may be detected and recognized. Once the key word is detected, it may be deemed that a breakpoint occurs. In one embodiment, the detection of breakpoints is included in block 30 as described above. In another embodiment, the detection of breakpoints may be performed by other procedure steps or processes. Once a breakpoint is detected, the execution of the program needs to be suspended, i.e., performing block 32.

In particular, once a breakpoint is detected in the program, block 32 suspends the execution of the main program at the breakpoint, or in other words, the main program is blocked at the breakpoint. This may be realized by inserting block-forming code at the breakpoint.

In contemporary implementations, developers often need to set breakpoints when debugging programs, and suspend the execution of programs at the breakpoints. Therefore, in addition to the implementing modes described in detail above, the implementing modes of detecting breakpoints and the implementing modes of suspending programs in block 32 may be realized by referring to other methods in the art, or by employing other methods that those skilled in the art can expect.

In parallel with the suspension of the program, in block 34, the process obtains the callback corresponding to the detected asynchronous call. As described above, JavaScript realizes the asynchronous call mainly by communications with the server end. Therefore, in this block, in order to obtain the execution result of the asynchronous call, it firstly sends a call request to the server end according to the asynchronous call detected in block 30, and then, monitors the response of the server end to capture the callback to the main program by the server end after processing the called function.

In block 36, according to user selection, the obtained callback(s) are inserted into specified position(s) of the program, respectively. In one embodiment, each time the process obtains a callback of an asynchronous call, it inserts the callback into a specified position according to a user selection. In another embodiment, it puts the obtained callbacks of asynchronous calls in a callback library. The callback library may be realized by various caches or memories. After putting corresponding callbacks of all the detected asynchronous calls into the callback library, according to user selection, it inserts these callbacks from the callback library into specified positions of the JavaScript main program.

After the callbacks are inserted back into the main program, in block 38, the process continues executing the main program from the breakpoint. In this case, as the callbacks of the asynchronous calls are inserted into specified positions of the program according to one or more user selections, during the subsequent execution of the program, the execution order of the callback functions is arranged according to the user selections. Thus, in the program debugging stage, users may control the return of the asynchronous call, and set the return time and return order as needed, thereby facilitating the testing and debugging of the program.

If multiple breakpoints are arranged in the program, the multiple breakpoints may divide the program into multiple code segments. Except for the last code segment (the code segment at the end of the program), every code segment ends with a breakpoint. In this case, the method according to the above embodiment may be performed for each code segment, such that the execution of the program stops at the end of the code segment, and after the callbacks of the asynchronous calls in the code segment are put back into the program, it continues executing the next code segment, thereby realizing program debugging segment by segment.

In order to make users better understand the procedure of each asynchronous call, the process may provide the call-related information to users when the program is debugged. To this end, in one embodiment, the above method further comprises providing an information table, which is used to show the information of the detected asynchronous calls, the information of the corresponding callbacks, and the correlation information between the asynchronous calls and the corresponding callbacks. In particular, once the process detects an asynchronous call while performing the above block 30, it records the information of the asynchronous call, such as the call object, the call stack, etc. As described above, in the case of multiple asynchronous calls, these call functions may be assigned with reference numbers. In this case, the reference numbers are also recorded. On the other hand, it needs to record the information of the callback that corresponds to the asynchronous call, such as the callback handler and the reference thereof. For the information recorded as above, the process may provide the information to users in the form of an information table. Thus, the information table shows not only the information of the asynchronous calls and the information of the callbacks, but also the correlation information between the asynchronous calls and the corresponding callbacks. Such an information table allows users to clearly know the context information about each asynchronous call and the callback thereof in the process of program debugging, and thus understand the whole calling procedure. With the help of such an information table, users may trace or backtrack the calls in the program better.

In the method described above, the callbacks corresponding to the asynchronous calls are inserted into specified positions of the program according to user selection. The user selections described above may be obtained by many ways. In one embodiment, user selections may be predetermined by users before performing the blocks of FIG. 3, for example, by default, executing callback functions in the order of asynchronous calls. In another embodiment, the process may interact with users when performing the above method, obtain the user selections dynamically, and thus arrange the callbacks according to the user selections.

In order to interact with users dynamically, in one embodiment, the method further comprises: providing users with callback-related options, and receiving user selections of the options. In one embodiment, the options provided to users comprise the option of callback inserting position to allow users to designate positions where the callbacks should be inserted. In another embodiment, in order to allow users to intuitively control and arrange the callbacks of the asynchronous calls, the options provided to users further comprise the information table as described above, and the option of the callback inserting position is made to be combined with the information table. Therefore, when users designate the inserting positions of the callbacks, they may refer to the information table to determine the asynchronous calls corresponding to every callback and know the context information of the asynchronous calls, and thus are able to more clearly arrange the inserting positions and the return order of the callbacks.

In one embodiment, the above options are provided to users in the form of a graphical user interface (GUI), such that the options are presented more intuitively. In addition to showing the option of the callback inserting position, the interface can further receive the user selections of the options as a basis for subsequent execution of callback insertion.

Therefore, the method according to the above embodiment interacts with users in the process of program debugging to thus obtain user selections, and arranges the inserting positions of the callbacks based on the user selections. Therefore, users can test various execution orders of callbacks as needed when testing programs, and thus find potential problems relating to callback executing order in the programs.

The above implementing modes are described in conjunction with JavaScript. It will be understood, however, the above disclosure may also be applied to other programming languages. For example, for other single-threaded programs, the predetermined code set may be revised as described above to include the set of asynchronous call functions that can be supported by the programs. The implementing modes of other steps are similar to that of JavaScript.

Figure 4:
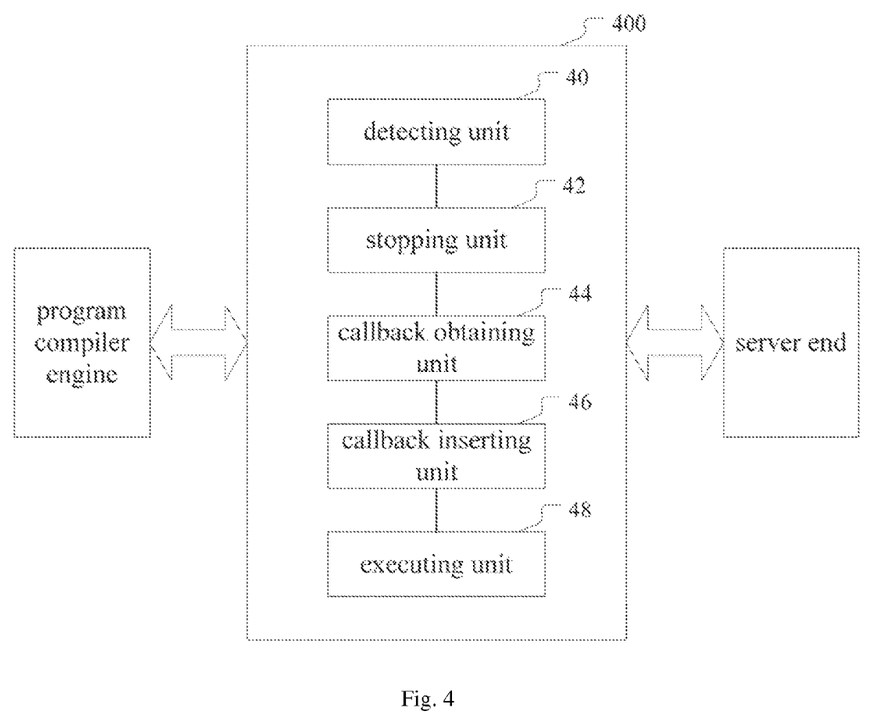
FIG. 4 shows an apparatus for controlling asynchronous call return according to one embodiment.

An exemplary embodiment further provides an apparatus for controlling asynchronous call return. FIG. 4 shows an apparatus for controlling asynchronous call return according to one embodiment. In FIG. 4, the apparatus is generally labeled as 400, and comprises the following units: a detecting unit 40, configured to detect at least one asynchronous call in the program; a stopping unit 42, configured to, in response to detecting a set breakpoint, stop the execution of the program at the breakpoint; a callback obtaining unit 44, configured to obtain a callback corresponding to the asynchronous call; a callback inserting unit 46, configured to insert the callback into a specified position of the program according to user selection; and an executing unit 48, configured to, in response to the insertion of the callback into the program, continue executing the program from the breakpoint.

In one embodiment, the apparatus 400 is coupled with a program compiler engine, in order to perform the program testing and controlling operations; in the meantime, the apparatus 400 communicates with the server end to send requests and capture the response of the server end. The coupling and communication between the apparatus 400 and other apparatuses may be realized by using various protocols in various well known wired or wireless implementations.

In one embodiment, the above apparatus 400 further comprises an information table providing unit (not shown), configured to provide an information table to users. In particular, in case the detecting unit 40 detects an asynchronous call, the information table providing unit may record the information of the detected asynchronous call, and record the information of the callback corresponding to the asynchronous call. Based on the above recorded information, the information table providing unit organizes it into an information table and provides the table to users, where the table shows not only the information of the asynchronous call and the information of the callback, but also the correlation information between the asynchronous call and its corresponding callback. Such an information table allows users to clearly know the context information of each asynchronous call and the callback thereof during the process of program debugging, and thus understand the whole calling procedure.

In one embodiment, the above apparatus 400 further comprises an interface unit (not shown), configured to provide users with callback-related options, and receive one or more user selections of the callback-related options. In one embodiment, the callback-related options provided to users comprise the option of callback inserting position to allow users to designate positions where the callbacks should be inserted. In another embodiment, in order to allow users to intuitively control and arrange the callbacks of the asynchronous calls, the option of callback inserting position is provided to users on the basis of the information table described above. The above interface unit can further receive user selections on the options, and take it as the basis for the callback inserting unit 46 to perform the callback insertion.

By using the above apparatus 400, during program debugging, users can arrange the return order of the asynchronous calls as needed and thus test all kinds of potential problems of the program.

The detailed implementing modes of the above units will not be described in detail for the description is similar to that for the method of controlling asynchronous call with reference to detailed examples hereinbefore.

In one embodiment, as many script programs are compiled in browsers, therefore, the apparatus 400 may be realized in the form of browser plug-ins. In another embodiment, the apparatus 400 may be realized as a supplemental functional component for a program debugging tool. In yet another embodiment, the apparatus 400 may be an independent tool to help developers to debug programs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling asynchronous call return in a program, comprising:
   detecting at least one asynchronous call in the program by a processor;
   in response to detecting a breakpoint that is set at a labeled location in the program, stopping execution of the program at the breakpoint;
   obtaining at least one callback corresponding to the at least one asynchronous call by sending a call request of the at least one asynchronous call to a server end and obtaining from the server end the at least one callback corresponding to the at least one asynchronous call while execution of the program remains suspended at the breakpoint;
   providing one or more users with callback-related options comprising an option of callback inserting position and an information table used to show information of the at least one asynchronous call, information of the at least one callback, and correlation information between the at least one asynchronous call and the at least one callback;
   receiving one or more user selections of the callback-related options;
   inserting, by the processor, the at least one callback into one or more specified positions of the program respectively according to the one or more user selections; and
   in response to the insertion of the at least one callback into the program, continuing execution of the program from the breakpoint according to an execution order of the at least one callback as defined by the one or more specified positions of the program.

2. The method according to claim 1, wherein detecting the at least one asynchronous call in the program is realized by scanning code of the program, comparing the code with a predefined code set, and detecting one or more asynchronous calls in the program.

3. The method according to claim 1, wherein the breakpoint that is set in the program is detected by scanning code of the program and recognizing a key word for guiding or labeling breakpoints.

4. The method according to claim 1, wherein stopping execution of the program at the breakpoint comprises: inserting block-forming code at the breakpoint of the program, thereby stopping execution of the program.

5. The method according to claim 1, wherein the callback-related options are provided in a form of graphical user interface.

6. An apparatus for controlling asynchronous call return in a program, comprising:
   a processor and memory comprising instructions executable by the processor to implement a plurality of units comprising:
   a detecting unit that detects at least one asynchronous call in the program;
   a stopping unit that stops execution of the program at a breakpoint in response to detecting that the breakpoint is set at a labeled location in the program;
   a callback obtaining unit that obtains at least one callback corresponding to the at least one asynchronous call by sending a call request of the at least one asynchronous call to a server end and obtaining from the server end the at least one callback corresponding to the at least one asynchronous call while execution of the program remains suspended at the breakpoint;
   an interface unit that provides one or more users with callback-related options, and receives one or more user selections of the callback-related options, wherein the callback-related options comprise an option of callback inserting position and an information table used to show information of the at least one asynchronous call, information of the at least one callbacks, and correlation information between the at least one asynchronous call and the at least one callback;
   a callback inserting unit that inserts the at least one callback into one or more specified positions of the program respectively according to the one or more user selections; and
   an executing unit that continues execution of the program from the breakpoint in response to the insertion of the at least one callback into the program according to an execution order of the at least one callback as defined by the one or more specified positions of the program.

7. The apparatus according to claim 6, wherein the detecting unit scans code of the program, compares the code with a predefined code set, and thereby detects the at least one asynchronous call in the program.

8. The apparatus according to claim 6, wherein detecting that the breakpoint is set in the program is performed by scanning code of the program and recognizing a key word for guiding or labeling breakpoints.

9. The apparatus according to claim 6, wherein the stopping unit inserts block-forming code at the breakpoint of the program, and thereby stops execution of the program.

10. The apparatus according to claim 6, wherein the callback-related options are provided in a form of graphical user interface.

11. A computer program product for controlling asynchronous call return in a program, the computer program product comprising:
    a computer readable storage memory having computer readable program code embodied therewith, the computer readable program code comprising:
    computer readable program code configured to:
    detect at least one asynchronous call in the program;
    stop execution of the program at a breakpoint in response to detecting that the breakpoint is set at a labeled location in the program;
    obtain at least one callback corresponding to the at least one asynchronous call by sending a call request of the at least one asynchronous call to a server end and obtaining from the server end the at least one callback corresponding to the at least one asynchronous call while execution of the program remains suspended at the breakpoint;
    provide one or more users with callback-related options comprising an option of callback inserting position and an information table used to show information of the at least one asynchronous call, information of the at least one callback, and correlation information between the at least one asynchronous call and the at least one callback;

receive one or more user selections of the callback-related options;

insert the at least one callback into one or more specified positions of the program respectively according to the one or more user selections; and continue execution of the program from the breakpoint in response to the insertion of the at least one callback into the program according to an execution order of the at least one callback as defined by the one or more specified positions of the program.

* * * * *